May 5, 1953  F. CARTLIDGE  2,637,603
MUCK STRIPPER FOR ENDLESS TRACK TREADS
Filed Dec. 7, 1951  2 SHEETS—SHEET 2
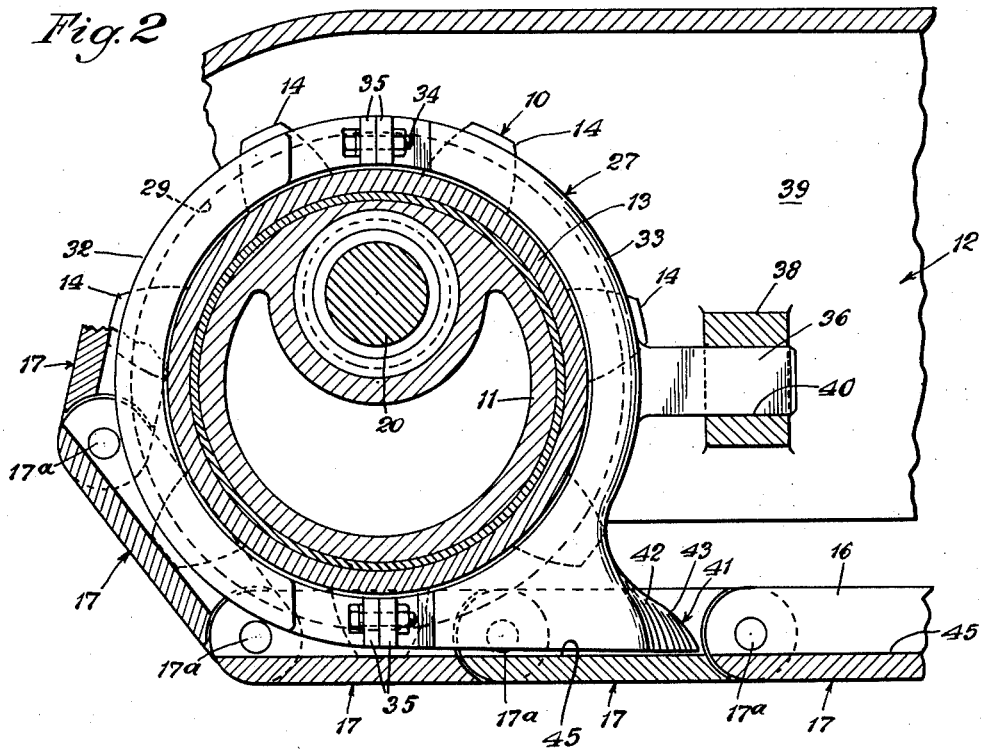
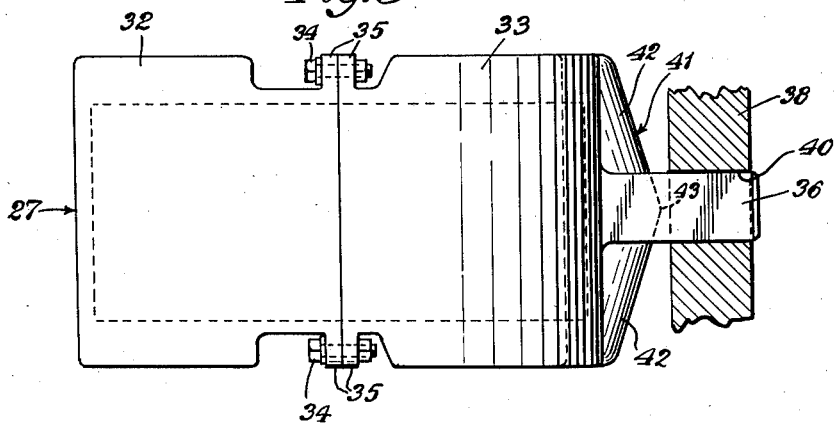
Inventor
Frank Cartlidge
by Murray A. Gleeson
Attorney Patented May 5, 1953

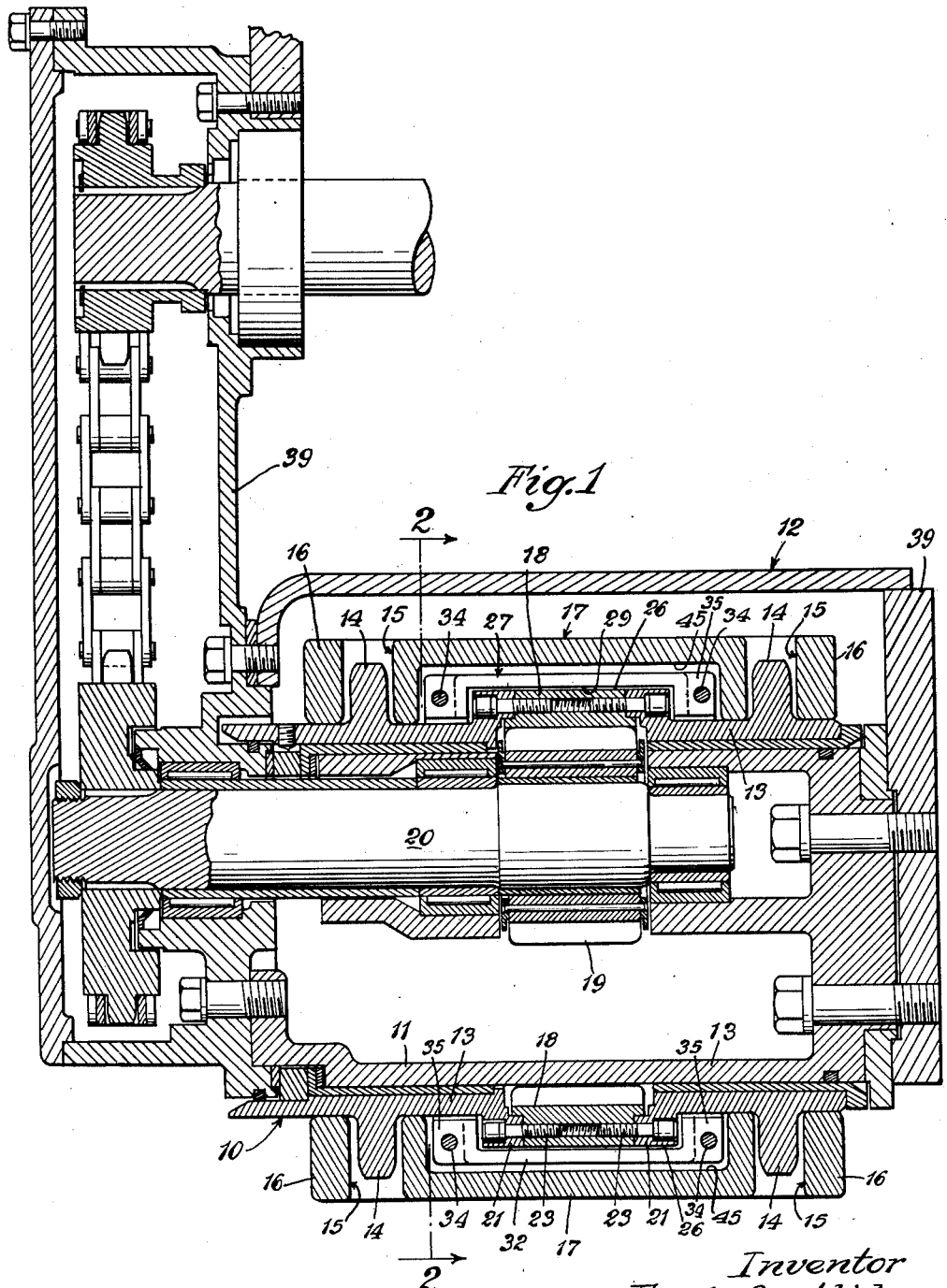

2,637,603

UNITED STATES PATENT OFFICE 2,637,603

MUCK STRIPPER FOR ENDLESS TRACK TREADS

Frank Cartlidge, Chicago, Ill., assignor to Goodman Manufacturing Company, Chicago, Ill., a corporation of Illinois Application December 7, 1951, Serial No. 260,349

5 Claims. (Cl. 305—4)

This invention relates to improvements in muck strippers for endless track treads, particularly applicable for use in connection with drive sprockets for such track treads where the diameter of the sprocket is almost that of the inner side of the track passing around it, as is the case where the hub of the sprocket has to be enlarged to accommodate gear reduction mechanism therein.

The object of the invention is to provide a simple and effective form of stripper ring to be interposed between the hub of a drive sprocket and the inner faces of the tread units as they move around the sprocket, the stripper ring having means thereon for preventing any foreign material or objects of substantial size from being carried around the sprocket during the operation of the endless track tread.

The invention may best be understood by reference to the accompanying drawings, in which:

Figure 1 is a vertical section taken along the axis of the drive sprocket of an endless tread vehicle showing details of the vehicle;

Figure 2 is a fragmentary section taken generally along line 2—2 of Figure 1, with parts of the endless tread omitted;

Figure 3 is a detail view of the stripper ring viewed from the top of the assembly shown in the preceding figures and illustrating the manner in which the stripper ring is restrained from rotation by a cross bar rigid with the vehicle frame.

Referring now to details of the embodiment of the invention illustrated in the drawing, the same is shown as applied to the drive sprocket 10 rotatably mounted on a suitable cylindrical support 11 forming part of an endless tread vehicle frame shown fragmentarily at 12. The sprocket 10 has a hollow hub 13 with a plurality of sprocket teeth 14, 14 arranged in two laterally spaced rows for driving engagement with aligned sprocket teeth sockets 15 forming in upstanding end flanges 16 of tread plates 17. The proximate ends of said upstanding flanges are connected by pivot pins 17a to form the endless tread track for the vehicle.

The illustrative form of drive sprocket 10 shown herein has an internal gear ring 18 intermediate its ends designed to be driven from a pinion 19 on a shaft 20 extending into the sprocket hub on an axis eccentric to the drive sprocket axis. This form of internal gear drive is illustrative of several different types of gear reduction mechanisms which have heretofore been disposed within a drive sprocket for compactness in design of such machines. When various types of gear reductions are disposed in whole or in part within the tread sprocket 10 as in the present case, it is desirable to fashion its hub 13 with a relatively large diameter as compared with the diameter of its driving teeth 14.

In the form of internal gear drive illustrated in the drawing, it will be observed that the internal ring gear 18 is inserted between outwardly flanged portions 21, 21 formed integrally with said sprocket hub and is fixed to said flanges by bolts 23, 23 so that the ring gear forms a part of the hub. The ring gear 18, together with flanges 21, 21, form a projecting annular collar 26 surrounding the central portion of said hub in axially spaced relation from the teeth 14, 14 at opposite ends of the hub.

Referring now more particularly to the stripper means which forms the principal feature of the present invention, I provide a stripper ring 27 which completely surrounds the central portion of the hub 13 between the two rows of sprocket teeth at opposite ends thereof. In the form shown herein, the stripper ring also has an undercut annular groove 29 to accommodate the projecting annular collar 26 formed by the gear ring 18 and flanges 21, 21 as previously described. The stripper ring may be made up of two half portions 32 and 33, split on a vertical plane and connected to each other by bolts 34 passing through suitable laterally recessed flanges 35, 35 at the top and bottom of the ring.

The stripper ring 27 is loosely mounted in bearing relation about the exterior surface of the sprocket hub 13 and is held against rotation by suitable means, herein consisting of a radially projecting lug 36 formed integrally with the inner half 33 of the stripper ring and extending intermediate the upper and lower reaches of the track tread, into engagement with a cross bar 38 fixed at opposite ends to the side plates 39 of the main frame of the vehicle. In the form shown, the lug 36 is preferably rectangular in cross section and fits snugly in a recess 40 in cross bar 38 so as to aid in maintaining the stripper ring in concentric relation on the sprocket hub 13.

The inner half 33 of the stripper ring is also provided with a forwardly extending stripping nose 41 formed with widely diverging V-shaped surfaces 42, 42 inclined laterally and forwardly from a centrally disposed rib 43 so as to simulate a plow-like conformation normally disposed in position to engage and divert any foreign material of substantial size which may accidentally lodge on the upper surface of the tread plates 17 as they approach the sprocket 10.

Each of the tread plates 17, 17 is cut away or recessed along surfaces 45 between the upstanding marginal flanges 16 at opposite ends of each plate, which engage the hub 13 when passing around the sprocket 10. These central cut-away portions form an elongated channel extending lengthwise of the endless track tread, which affords a working clearance for the stripper ring 27. In the form shown herein, the recessed surfaces 45 are deeper than the axes of the pivots 17a so as to provide ample space for the stripper ring.

The use and operation of the stripping device is as follows:

The stripper ring 27 normally rides in bearing relation on the hub of the drive sprocket 10 and is held stationary by the lug 36 engaged with the cross bar 38 which is rigid with the main frame 12. The plow-shaped nose 41 of the stripper ring is thus maintained in close proximity to the upper surface of the tread plates 17 as they approach the drive sprocket 10 to pass around the latter during the operation of the vehicle. It will be understood that foreign objects, such as rocks, mud and debris, will often lodge on the upper surface of the treads as the vehicle is in operation and that it is highly undesirable to permit such foreign material to pass in any substantial amounts around the drive sprocket, where it may become squeezed between the sprocket hub and the plates and otherwise tend to interfere with the proper functioning of the sprocket.

With my novel form of stripping ring, any foreign material of substantial size will be brought into engagement with the plow-like nose 41 so as to be stripped upwardly therefrom and be deflected laterally in one direction or the other until eventually discharged between the bottom edge of the side plates 39 and the upper edges of the tread plates 17.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In combination with a vehicle frame having an endless tread track, a drive sprocket for said track comprising a generally cylindrical hub with sprocket teeth projecting therefrom, an endless track tread comprising a plurality of pivotally connected tread plates adapted to be trained about said drive sprocket for driving engagement by said sprocket teeth, a stripper ring disposed in bearing engagement about said sprocket hub and radially between the tread plates and said hub as they pass around the latter, means supporting said stripper ring relative to the vehicle frame to restrain rotation of said ring, and a plow-shaped nose carried by said ring normally positioned in proximity to the inner surfaces of the track plates as they approach said sprocket to strip foreign material from said tread plate surfaces.

2. A structure in accordance with claim 1, wherein the drive sprocket hub is provided with two rows of longitudinally spaced sprocket teeth near opposite ends thereof, and the stripper ring with its stripping nose is disposed axially between said rows of sprocket teeth.

3. A structure in accordance with claim 1, wherein the plow-shaped nose carried by the stripper ring includes diverging V-shaped surfaces inclined outwardly from a central rib for deflecting the material stripped from the tread surfaces toward opposite sides of the endless track tread.

4. A structure in accordance with claim 1, wherein the inner surfaces of the faces of the tread plates each has upstanding marginal flanges disposed in laterally spaced relation from each other toward opposite sides of the endless track tread to provide bearing engagement with the drive sprocket hub, and the inner faces of the tread plates are recessed between said marginal flanges to form a continuous channel extending longitudinally of the endless track tread, and wherein the plow-shaped nose carried by the stripping ring is adapted to extend in stripping position as the track plates approach the drive sprocket.

5. A structure in accordance with claim 4, wherein the channel formed along the inner faces of the several tread plates extend deeper than the axes of pivotal connection between adjacent tread plates.

FRANK CARTLIDGE.

References Cited in the file of this patent

UNITED STATES PATENTS

| Number | Name | Date |
| --- | --- | --- |
| 1,294,200 | Tritton | Feb. 11, 1919 |

FOREIGN PATENTS

| Number | Country | Date |
| --- | --- | --- |
| 263,161 | Great Britain | Apr. 21, 1927 |
| 546,017 | France | Aug. 7, 1922 |